United States Patent [19]

Matsuzawa et al.

[11] Patent Number: 4,907,535
[45] Date of Patent: Mar. 13, 1990

[54] MILK-CLAW FOR MILKING MACHINES

[75] Inventors: Minoru Matsuzawa, Nagano; Shigetada Tsuchiya; Toshiyuki Okatani, both of Suzaka, all of Japan

[73] Assignee: Orion Machinery Co. Ltd., Suzaka, Japan

[21] Appl. No.: 203,051

[22] Filed: Jun. 1, 1988

[51] Int. Cl.[4] ............................................. A01J 5/00
[52] U.S. Cl. .................................................. 119/14.55
[58] Field of Search .............. 119/14.16, 14.37, 14.54, 119/14.55

[56] References Cited

U.S. PATENT DOCUMENTS

| D. 142,510 | 10/1945 | Anderson | 119/14.54 |
|---|---|---|---|
| 2,626,590 | 1/1953 | Smith | 119/14.54 |
| 2,922,394 | 1/1960 | Jansson | 119/14.55 |
| 3,014,455 | 12/1961 | Olander | 119/14.55 |
| 3,528,389 | 9/1970 | Flöter | 119/14.55 |
| 4,231,323 | 11/1980 | Olander | 119/14.55 X |
| 4,287,853 | 9/1981 | Duncan | 119/14.55 |
| 4,314,526 | 2/1982 | Nordenskjold | 119/14.55 |
| 4,395,971 | 8/1983 | Happel et al. | 119/14.55 X |
| 4,434,744 | 3/1984 | Millar | 119/14.54 X |
| 4,537,152 | 8/1985 | Thompson | 119/14.54 |

FOREIGN PATENT DOCUMENTS

| 69333 | 1/1952 | Netherlands | 119/14.54 |

*Primary Examiner*—Robert P. Swiatek
*Assistant Examiner*—R. Thomas Price
*Attorney, Agent, or Firm*—Spencer & Frank

[57] ABSTRACT

A milk-claw for collecting milk sucked from cow's teats through teat cup liners and sending it to a vacuum milking machine, in which the horizontal sections of the collecting chamber in the milk-claw are formed polygonally to prevent the milk which flows into the milk collecting chamber through liner nipples from forming a whirlpool, and the vertical section of the collecting chamber is formed polygonally to prevent milk directed forcibly through a liner nipple into the milk collecting chamber from flowing backward through another liner nipple.

5 Claims, 9 Drawing Sheets

PRIOR ART

FIG.9

PRIOR ART

MILK-CLAW FOR MILKING MACHINES

BACKGROUND OF THE INVENTION

This invention relates to a milk-claw for collecting the milk sucked from cow's teats through teat cup liners and sending it to a vacuum milking machines.

RELATED ARTS STATEMENTS

Figure 8:
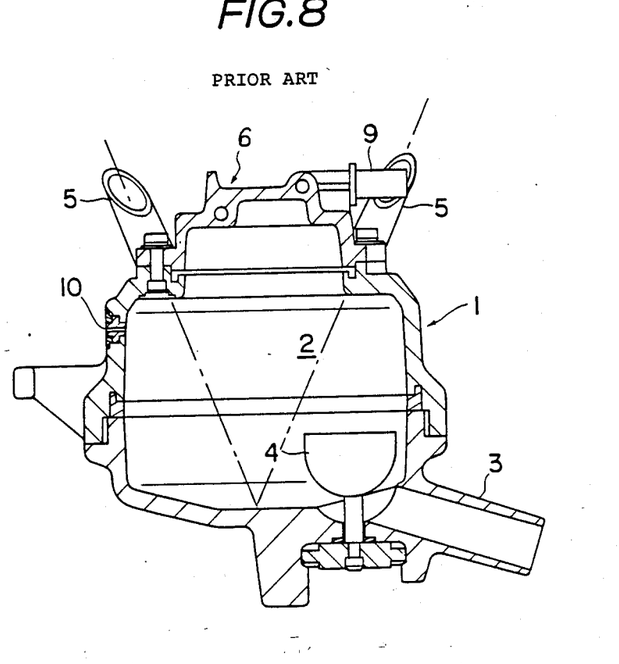
FIG. 8 is a vertical section of one embodiment of the known milk-claw.
Figure 9:
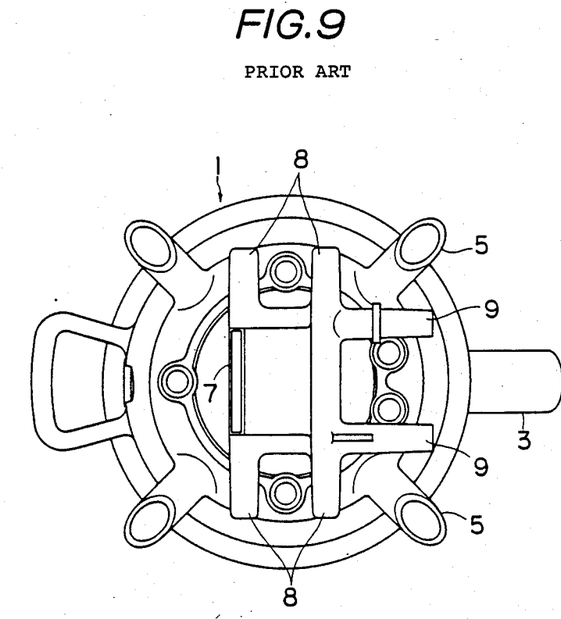
FIG. 9 is a plan view of the milk-claw illustrated in FIG. 8.

As a milk-claw for milking machines, there has been a well-known arrangement, as shown in FIG. 8 and FIG. 9, which has a milk-claw main body 1 containing a milk storing chamber 2 with substantially circular horizontal sections, and provided with a milk tube nipple 3 connected through on-off valve 4 to the lower part of said milk storing chamber 2 and with liner nipples 5, equal in number to the number of cow's teats, connected to the upper part of said milk storing chamber 2. The liner nipples 5 are inclined downwardly toward the center of the bottom of said milk storing chamber 2.

A pulsating cap 6 is mounted on the milk storing chamber 2, and a pulsating nipple 8 is formed on said pulsating cap 6 to supply vacuum (negative pressure) to teat cups (not shown). Nipples 9 are connected through tubes with a pulsater for supplying vacuum; and a bleedhole 10 is formed in the wall of the milk storing chamber 2.

In the structure of the milk-claw as mentioned above, milk sucked from a cow's teats flows through the liner nipple 5 into the milk storing chamber 2 toward the center of the bottom. The milk which flows into the milk storing chamber 2 then flows out through a milk tube nipple 3 by opening the on/off valve 4 at the lower end of milk storing chamber 2.

There are, however, the following disadvantages with said known type of milk-claw:

a. When the milk flows out of the milk storing chamber, a whirlpool of milk often occurs in the milk storing chamber due to the inflow of milk thereinto since the horizontal section thereof is nearly a circle. Once this whirlpool of milk occurs, the centrifugal force prevents the milk stored in the milk storing chamber from flowing out thereof quickly.

b. The occurrence of a whirlpool of milk causes milk to be churned, which may result in the separation of the fat, and thereby becomes a factor of deterioration of the milk.

c. When milk flows into the milk storing chamber through the liner nipples, the milk which has fallen onto the bottom of said milk storing chamber may run along the wall and flow backward through another liner nipple by the kinetic energy which milk has at the time of falling onto the bottom, since the outline of the vertical section of said milk storing chamber is formed smooth. This backflow of milk is undesirable because it may result in the contagion of mastitis between cow's teats.

Attempts have been made to prevent the milk from flowing backward by arranging the axes of the liner nipples in the manner that they would focus at the center of the bottom so that the flows of milk collide at the point.

This technique, however, has little effect for prevention of the milk flowing backward since the milk is not always sucked equally from each of cow's nipple.

Furthermore, there may be the risk of deterioration of milk since the collision of milk at a high speed may cause separation of the fat.

OBJECTS OF INVENTION

It is an object of this invention to overcome the disadvantages in the prior art milk-claw by providing a milk-claw in which the whirlpool of milk in the milk storing chamber does not easily occur.

It is another object of this invention to provide a milk-claw in which milk does not flow backward through liner nipples.

It is a further object of this invention to provide a milk-claw in which the fat is not separated.

SUMMARY OF THE INVENTION

According to this invention, the above objects can be achieved by a milk-claw for milking machines, comprising a milk collecting chamber therewithin and provided with liner nipples on the upper part thereof and a milk tube nipple in the lower part thereof, wherein the horizontal and vertical sections of said collecting chamber are shaped polygonally.

When sucked milk flows into the milk collecting chamber of the milk-claw of this invention, milk having flowed thereinto tends to form a whirlpool near the bottom thereof, said whirlpool having a right-handed rotation in the Northern hemisphere due to the effect of the rotation of the earth. However, since the horizontal sections of the milk collecting chamber are shaped polygonally, the milk flowing within the chamber stagnates at each of the angles of the walls of the milk collecting chamber and the kinetic energy of said flowing milk is reduced, so the milk cannot form any whirlpool.

As a result thereof, milk stored in the milk collecting chamber can flow out of the chamber quickly.

If milk has flowed into the milk-claw forcibly, it tends to run along the wall and flow backward through another liner nipple. However, since the vertical sections of the milk-claw are shaped polygonally, the milk cannot easily flow backward due to the flow resistance of milk which is larger than that of the prior art.

BRIEF DESCRIPTION OF THE DRAWINGS

In FIG. 1 through FIG. 7 showing the embodiments of the milk-claw according to this invention.

In FIG. 8 and FIG. 9 showing the embodiment of the prior art,

DETAILED DESCRIPTION OF PREFERRED EMBODIMENTS

Figure 1:
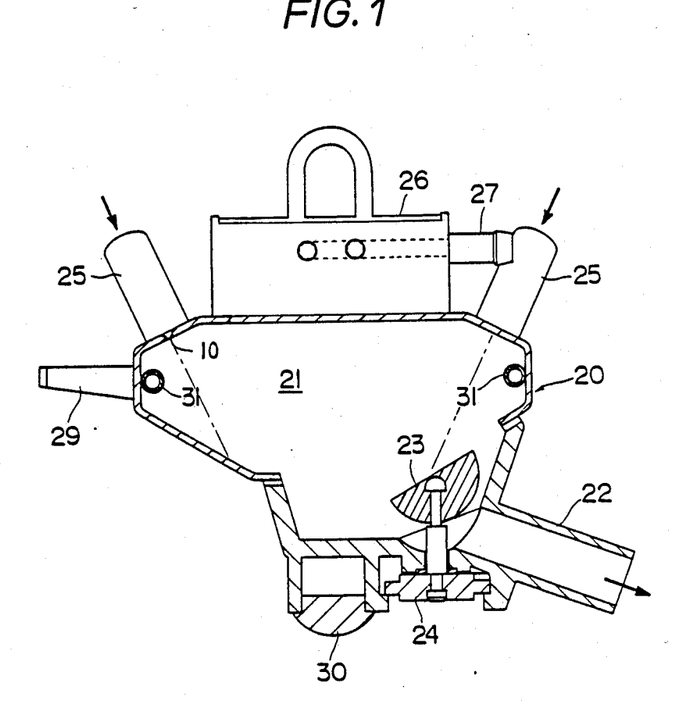
FIG. 1 is a vertical section of the first embodiment of the milk claw.
Figure 2:
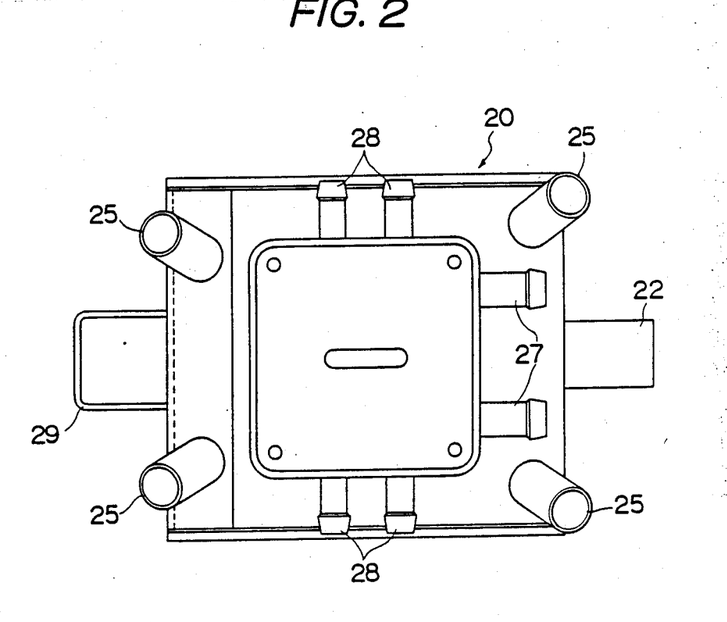
FIG. 2 is a plan view of the milk-claw illustrated in FIG. 1.

This invention will now be described in detail according to the embodiment illustrated in the drawings as follows:

In FIG. 1 and FIG. 2, reference numeral 20 denotes a milk-claw main body for milking machines and said milk-claw main body 20 is formed to have the vertical and horizontal sections shaped polygonally and defines therein a milk collecting chamber 21.

In the lower part of the milk-claw main body 20 there is formed a milk tube nipple 22 projecting outward as the outlet for milk. This outlet 22 is equipped with a valve 23 for opening/shutting said outlet.

When this valve 23 is opened continuously at the time of washing or the like, this valve 23 is suspended at the opened position by a stopper 24 provided in the outside of the milk-claw main body 20.

In the upper part of the milk-claw main body 20 there are formed four liner nipples 25 at four points respectively as the inlets for milk. A pulsating cap 26 is partitioned from the milk collecting chamber 21 and provided with nipples 27 for supplying vacuum which is connected to the pulsater (not shown) and with pulsating nipples 28.

These nipples 27 and 28 are connected to each other so that each of the nipples 27 are connected to the nipples 28 in the front and rear or at the right and left respectively.

A hook 29 is attached to the side face of the milk-claw main body 20 and a rubber cap 30 is provided at the lower end of the milk-claw main body 20 as a shock absorbing member.

There are formed cylindrical projections 31 within the collecting chamber 21, extending horizontally along the walls thereof. Bleed holes 10 are formed in the milk-claw main body 20 as in the prior art.

In the milk-claw according to this invention constructed as above the milk sucked from cow's teats flows through the liner nipples 25 into the milk collecting chamber 21. Then the milk flows down along the walls and are collected within the collecting chamber 21.

This collected milk flows out through the milk tube nipple 22 since the outlet of milk is opened in the course of sucking milk from cow's teats.

At this moment, the milk tends to form a whirlpool with right-handed rotation (if in the Northern hemisphere). However, horizontal circular of milk in the collecting chamber 21 is obstructed by the walls, since the horizontal sections of the milk-claw main body 20 are shaped polygonally and have angles. As a result of this obstruction, the flow resistance of the milk is increased and it prevents the milk from forming a whirlpool.

On the other hand, if milk falls from the liner nipples 25 forcibly, part of said milk tends to run along the wall of the milk collecting chamber 21 and flow backward through another liner nipple to another cow's teat.

However, since the vertical sections of the milk-claw main body 20 are shaped polygonally, the force of the milk is reduced at each angle of the polygonally arranged walls and the milk is prevented from flowing backward.

In this embodiment, said backflow of milk can be prevented with still more certainty as a result of the projections 31 extending horizontally along the wall of the milk collecting chamber 21.

Figure 3:
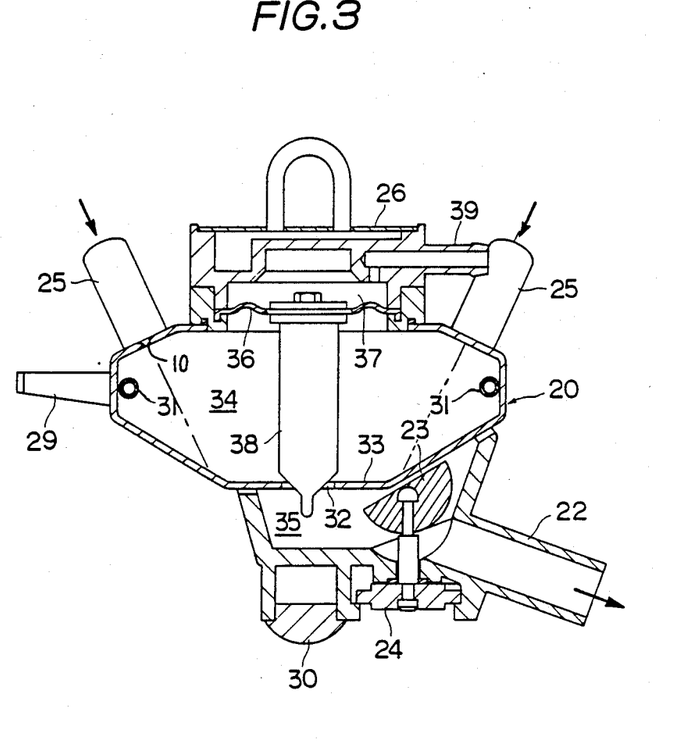
FIG. 3 is a vertical section of the second embodiment of the milk-claw according to this invention.
Figure 4:
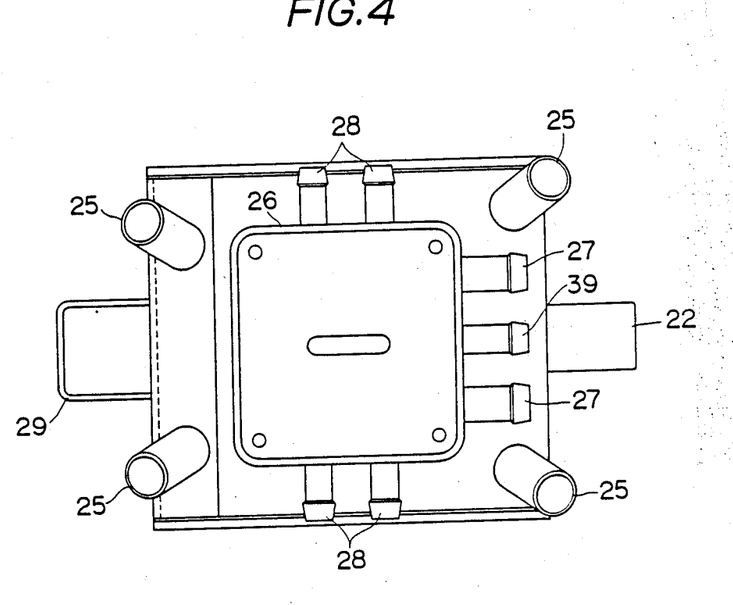
FIG. 4 is a plan view of the milk-claw illustrated in FIG. 3.

FIG. 3 and FIG. 4 show the second embodiment.

FIG. 3 and FIG. 4 illustrate the application of this invention to another type of milk-claw (claimed in Japanese Patent Publication No. 85-19972), wherein the milk collecting chamber 21 of above first embodiment is partitioned into a milk collecting chamber 34 and a milk storing chamber 35 by a plate 33 having a pressure-control hole 32 at the center and a low-pressure chamber 37 is formed in the upper part of the milk collecting chamber 34 by means of partition by a diaphragm 36. From and said diaphragm 36 hangs a pressure control bar 38 which closes the pressure control hole 32 when the pressure difference between in the milk collecting chamber 34 and in the milk storing chamber 35 exceeds a certain level.

In this second embodiment, the horizontal and vertical sections of both the milk collecting chamber 34 and the milk storing chamber 35 are shaped polygonally.

A pressure control nipple 39 communicating with the low pressure chamber 37 is provided in the pulsating cap 26 to supply negative pressure of a fixed level to the low pressure chamber 37.

In this embodiment as well as the aforesaid first embodiment, the formation of a whirlpool near the outlet of milk and the pressure control hole can be prevented since the horizontal and vertical sections of both the milk collecting chamber and the milk storing chamber are shaped polygonally.

Figure 5:
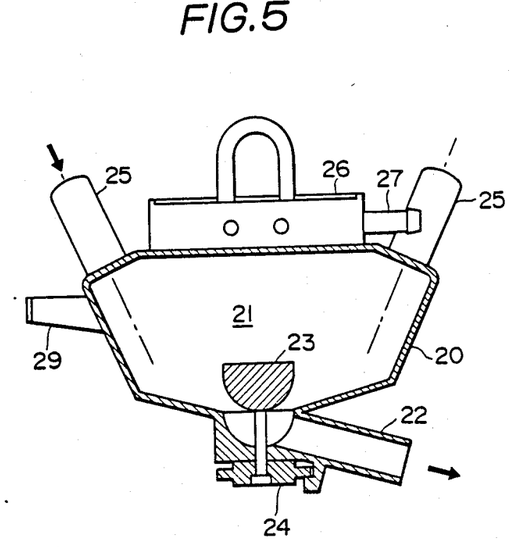
FIG. 5 is a vertical section of the third embodiment of the milk-claw according to this invention.

FIG. 5 shows the third embodiment.

FIG. 5 illustrates a milk-claw in which the outlet of milk is formed at the center of the bottom of the milk collecting chamber 21, and the vertical section of said milk collecting chamber 21 is shaped polygonally as defined by walls extending in parallel with the axis of the liner nipples 25. As a result thereof, the milk collected in the milk collecting chamber 21 will cannot easily be dispersed or bubbled. Accordingly, the separation of the fat in the milk can be prevented.

Figure 6:
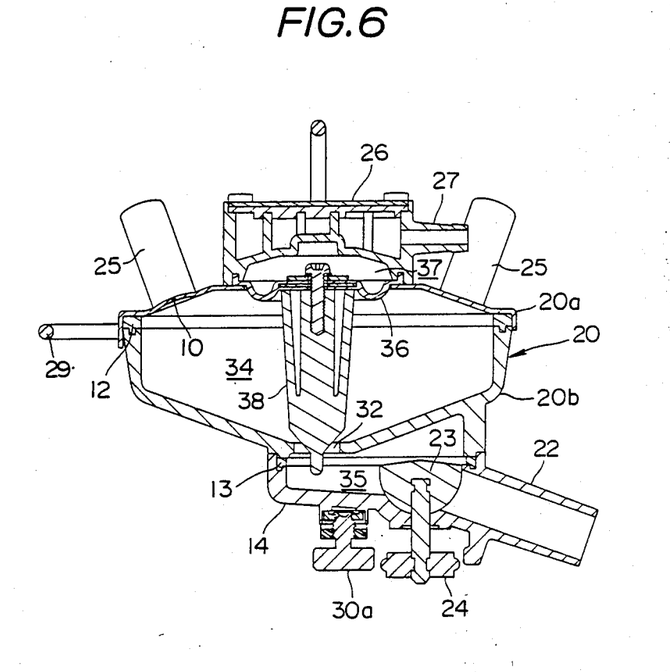
FIG. 6 is a vertical section of the fourth embodiment of the milk-claw according to this invention.
Figure 7:
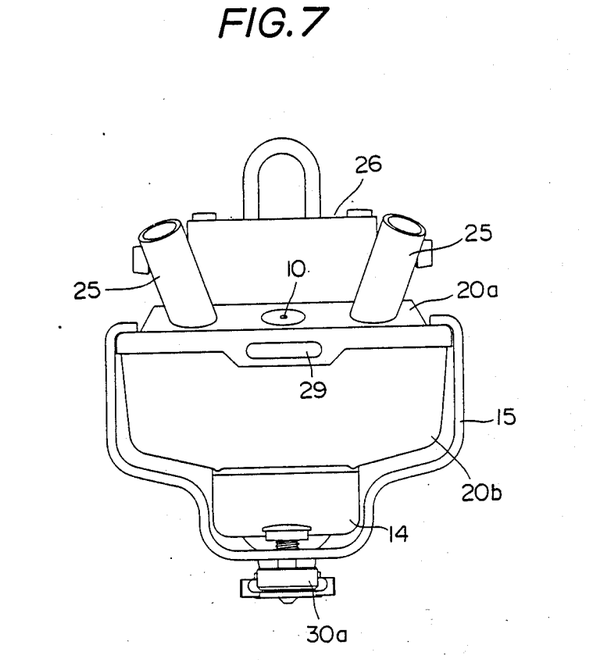
FIG. 7 is a rear view of the milk claw illustrated in FIG. 6.

FIG. 6 and FIG. 7 show the fourth embodiment.

This fourth embodiment relates to a milk-claw which can control the pressure within the milk collecting chamber 34 with the pressure control bar 38 and the pressure control hole 32 as well as the second embodiment shown in FIG. 3 and FIG. 4.

The milk-claw main body 20 of this embodiment comprises a cover 20a made of metal and provided with four liner nipples 25 at four points thereof, a container 20b made of plastic which is transparent and has horizontal sections shaped polygonally, and a claw cap 14 made of transparent synthetic resins. Packings 12, 13 are inserted between the cover 20a and the container 20b and between the container 20b and the claw cap 14 respectively.

The cover 20a, the container 20b and the claw cap 14 are united together detachably by a fixing-claw hanger 15 gripping on the cover 20a and the claw cap 14 as shown in FIG. 7, and the force of gripping can be controlled with a pressure control screw 30a fastening the hanger 15 and the claw cap 14.

Due to the abovementioned structure, the milk-claw of this embodiment can be disassembled into three parts, which facilitates cleaning by washing of this milk-claw after use, since the milk-claw 20 is designed to be united by the grip of the fixing claw hanger 15.

Further, the state within the milk collecting chamber can be seen since the cover is made of transparent material.

If the axes of liner nipples are arranged to come across the bottom wall of the milk collecting chamber at the point nearer than the center of said bottom, as shown in FIG. 1 and FIG. 3, the velocity of the milk along said bottom wall can be reduced, so the backflow of the milk as well as deterioration can be prevented with greater certainty.

In addition, the capacity of the milk collecting chamber can be increased in comparison to the outside size of the milk-claw by enlarging the flat region of the bottom wall thereof. This does not only stabilize the pressure within the chamber but also levels the outflow of milk through the milk tube nipple because the milk can spread widely within the chamber.

EFFECT

As mentioned above, the embodiments of the milk-claw according to this invention can prevent the formation of a whirlpool of milk near the outlet since the horizontal and vertical sections of said milk-claw are formed polygonally in contrast with the prior art milk-claws having substantially circular horizontal and vertical sections. Therefore, the milk can flow out more quickly than in the prior art milk-claw because it is not obstructed by a whirlpool of milk.

Further, this milk-claw can prevent the infection of matitis between cow's nipples since it can prevent milk from flowing backward by forming the vertical sections polygonally, which used to happen in the known types of milk-claw.

What is claimed is:

1. A milk-claw for a milking machine, comprising:
   a housing having an inner surface bounding and enclosing a milk collecting chamber, said housing having an upper part and a lower part below said upper part;
   at least one liner nipple in said upper part, communicating with an upper end of said chamber; and
   a milk tube nipple in said lower part, communicating with a lower end of said chamber;
   said inner surface having a polygonally shaped vertical cross section, said inner surface having a polygonally shaped horizontal cross section so that said inner surface obstructs milk entering said chamber via said at least one liner nipple from forming a whirlpool.

2. A milk-claw as in claim 1, wherein said at least one liner nipple comprises a plurality of liner nipples.

3. A milk-claw as in claim 2, wherein the liner nipples have axes in respective directions of flow of milk entering said chamber, said axes being parallel to a wall of said chamber.

4. A milk-claw as in claim 2, wherein said chamber has vertically extending walls, the milk-claw further comprising a horizontally extending projection along said walls in said chamber.

5. A milk-claw as in claim 2, wherein said upper part of said housing includes a metal cover, said plurality of liner nipples including four spaced apart liner nipples opening into said chamber through said cover, and said lower part of said housing includes a transparent plastic container connected to said cover, the milk-claw further comprising a claw cap connected to a bottom end of said container, said claw cap including said milk tube nipple.

* * * * *